United States Patent [19]

Dantoni

[11] 4,217,858
[45] Aug. 19, 1980

[54] METHOD OF MAKING ANIMAL LITTER

[76] Inventor: Joseph L. Dantoni, 2787 Old Washington Rd., Westminster, Md. 21157

[21] Appl. No.: 22,289

[22] Filed: Mar. 20, 1979

Related U.S. Application Data

[63] Continuation of Ser. No. 850,437, Nov. 10, 1977, abandoned, which is a continuation of Ser. No. 694,347, Jun. 9, 1976, abandoned, which is a continuation-in-part of Ser. No. 504,870, Sep. 11, 1974, Pat. No. 3,972,971.

[51] Int. Cl.² .............................................. A01K 1/015
[52] U.S. Cl. ...................................................... 119/1
[58] Field of Search ........................................... 119/1

[56] References Cited

U.S. PATENT DOCUMENTS

| | | | |
|---|---|---|---|
| 3,675,625 | 7/1972 | Miller et al. | 119/1 |
| 3,921,581 | 11/1975 | Brewer | 119/1 |
| 3,941,090 | 3/1976 | Fry | 119/1 |
| 3,983,842 | 10/1976 | Marion et al. | 119/1 |

*Primary Examiner*—Hugh R. Chamblee
*Attorney, Agent, or Firm*—John F. McClellan, Sr.

[57] ABSTRACT

An improved animal litter and the method of making the same from peanut hulls, consisting of cleaning the hulls of all foreign material, crushing and/or grinding the peanut hulls to a size that will allow the hull particles to lie close together, either with or without an additive up to 50% by weight of the mixture, then the hulls or mixture being subjected to live steam or moisture, impregnating the peanut hulls or mixture with moisture and heat to soften the material to a point where it is in a pliable state, the pliable mass then being pelleted by forcing the hulls or mixture through a pelleting die of a pelleting machine, after which the pellets are removed from the pelleting die after they have reached a predetermined length. The preferred length of the pellets being approximately from 1/32 to ⅝ inch after which the pellets are cooled, dried, cleaned and bagged.

1 Claim, No Drawings

METHOD OF MAKING ANIMAL LITTER

This application is a continuation of Ser. No. 850,437 filed Nov. 10, 1977, now abandoned, which is a continuation of Ser. No. 694,347, filed June 9, 1976, now abandoned, which is a C-I-P of Ser. No. 504,870, filed Sept. 11, 1974, now U.S. Pat. No. 3972,971.

The present invention relates to an inert animal litter and a method of making the same from peanut hulls.

One object of the invention is to provide an animal litter that will be free from resins, tars and other ingredients that cause change in the enzyme systems of animals when used as bedding or litter.

A second object of the invention is to provide a litter that will not affect the estrogen activity of the animal when used as bedding or litter.

A third object of the invention is to provide a basic litter in which additives can be incorporated to aid pelleting, mask or suppress odor, prevent bacteria growth or dye the litter to control odor or improve the appearance of the litter.

A fourth object of the invention is to provide a litter that has not been subjected to pesticides which may cause a reaction in an animal, particularly when the animal is being used for scientific study.

A fifth object of the invention is to provide a method of making an animal litter that may be used for mulch and/or fertilizer after it has been previously used for a litter.

Both soft and hard wood chips and sawdust make good animal litter; they are inexpensive, available and absorbent; however, they have one very serious problem, woods contain tars and resins which cause changes in the liver enzyme system of animals where wood is used as contact litter or bedding.

Peanut hulls are of substantially the same composition as wood, namely, 60% crude fiber, 30% lignin, 7% protein and 3% ash. The peanut hull is a woody legume shell and part of the root system of the peanut plant. Peanut hulls do not contain the tars and resins found in wood, do not contain pesticides, do not suppress or increase activity of the animal's liver enzyme system and are an inert bedding.

Processed corn cobs are a good animal litter and widely used. However, corn cobs affect the estrogenic activity of the animal bedded directly on the processed cobs. Pelleted peanut hulls are inert and do not affect the animal's estrogen cycle.

While several objects of the invention have been set forth, other objects and advantages will become apparent as the nature of the invention is more fully disclosed in the following description.

The animal litter is made primarily from discarded peanut hulls which at present are either burned or buried in the ground. The burning of the hulls releases a certain amount of fly ash and chemical gases into the air which has its affect on the environment. Also, when these hulls are buried, which amounts to thousands of tons, they do not work out too well as good land fills for the reason that they are too light, contain voids and decay slowly.

The peanut hulls from the shelling machine are ground in a hammermill where they are pulverized to a predetermined size, preferably of such a size to pass through a ⅜ inch screen. The ground peanut hulls as they come from the mill are subjected to live steam or moisture and agitated to become a continuous, soft, pliable mass. Or ground hulls may be mixed with one or more additives of not more than 50% by weight of the moisture and then subjected to the steam or moisture softening process.

After the ground hulls, or the mixture, have been softened by the steam and/or moisture, they are forced through appropriate dies of a pelleting machine, preferably 1/32 inch to ⅜ inch in diameter, to pelletize the hulls and/or the mixture into a predetermined size. After the pelletized material passes through the dies, the pellets are cut, dried, cooled and cleaned, leaving less than 18% of moisture in the pelletized litter resulting in a relatively small, compact, and heavy particle compared to the pre-pelletized ground hulls. The pelleted peanut hulls are reduced in volume by approximately 50 to 90 percent making them a dry, highly absorbent, clean, compact substance. The pelletized hulls absorb over twice their weight in water. Pellets formed from the peanut hulls may be of different densities, the harder the pellet the less absorbent it is. It has been found that a density of 15 to 90 pounds per cubic foot of pellets is substantially the desirable hardness for a satisfactory animal litter pellet.

Peanut hulls are composed of two parts, or fractions, one part or fraction being a soft, very absorbent, inner membrane, and the second part or fraction being a slightly less absorbent outer membrane. The two parts may be separated after the grinding of the whole hull by using an air current or sieve. The separated parts of the hulls may be treated and pelletized as previously described for use as a litter, or they may be remixed in predetermined proportions before pelletizing.

The additives mentioned hereinbefore are materials having the characteristics of a lubricant and/or a binder. A single additive may have both a lubricant and a binder characteristic. The purpose of the lubricant additive is to lubricate the soft pliable mass in order that it will pass more readily through the pellet die. The additive supplying the binder to the mass is for stabilizing the pellets in their final form. Either type additive may be added to the ground peanut hulls, or both additives may be sized into the same batch of ground peanut hulls, and in different proportions. For example, it may require less lubricant for pellets made from the soft inner membrane of the hull than for pellets made from the hard outer membrane of the hull.

Materials containing binder characteristics come in a number of forms such as sodium bentonite, clay, lignin, etc.; the materials containing lubricants also come in various forms, such as, gelatin, starch, oil and the like.

Pelleted peanut hulls are both bio-degradable and flushable. A convenience in using peanut hulls as an animal litter is the ability to dispose of it by flushing the litter into the sewer where it easily breaks up and washes away upon contact with the water.

Another unique advantage of pelletizing peanut hull litter is that aflatoxin is not produced in peanut hull litter even when mold grows on the litter.

Several experiments were conducted on peanut hulls to evaluate the relationship of peanut hulls and aflatoxin. One experiment was conducted using peanut shells from peanuts with a high level of aflatoxin. No aflatoxin was found in the hulls. Another experiment was conducted by inoculating peanuts and peanut hulls with the mold Aspergillis Falvug to determine if aflatoxin would be produced. The inoculated hulls and peanuts were incubated under ideal conditions for the development of aflatoxin. Aflatoxin was produced in the peanuts but not in the peanut hulls.

However, aflatoxin is produced in other animal litters, such as, pelletized alfalfa, corn cobs and the combinations of these. Wood and wood-like peanut hulls are, so far as is known, the only all vegetable animal litter that does not produce aflatoxin.

The steam used to moisten and heat the hulls, and the heat generated by the pressure forcing the hulls through the pelleting dies of the pelleting machine, kill most organisms present, making the resulting pellets clean and almost sterile.

The finished product is also a very desirable mulch and/or fertilizer as it is readily broken down by water, and when used for plant fertilizer the action of water will cause the pellets to readily fall apart and become a part of the soil. If the pellets are not used for fertilizer, they are easily disintegrated by water and may be flushed into the sewer system.

While the above description sets forth a specific method of making animal litter primarily from discarded peanut hulls, it is not intended as a limitation as the scope of the invention is best defined in the appended claims.

I claim:
1. Method of preparing an animal litter substantially free of pesticides, resins and tars, comprising the steps:
 (a) obtaining peanut hulls produced as part of a plant root system;
 (b) pulverizing said obtained peanut hulls in a hammermill to a size passing a ⅜ inch screen;
 (c) receiving and treating pulverized peanut hulls from the hammermill with live steam;
 (d) agitating the live steam treated peanut hulls and producing a soft pliable mass of material not more than 50% moisture by weight;
 (d) further heating and sterilizing and drying the soft pliable mass of material by forcing same through a pelleting die; and
 (f) cutting, cooling and drying to a moisture content of less than 18% and a density of 50 to 90 pounds per cubic foot the pelletized material forced through the die; thereby preparing an animal litter substantially free of pesticides, resins and tars.

* * * * *